(12) United States Patent
Papineau

(10) Patent No.: US 7,895,577 B2
(45) Date of Patent: Feb. 22, 2011

(54) DEVICE FOR TESTING THE STRUCTURAL COVERAGE OF A SOFTWARE PROGRAM AND A METHOD IMPLEMENTING THE DEVICE

(75) Inventor: Jerome Papineau, La Chapelle Encherie (FR)

(73) Assignee: Thales (FR)

( * ) Notice: Subject to any disclaimer, the term of this patent is extended or adjusted under 35 U.S.C. 154(b) by 1035 days.

(21) Appl. No.: 11/571,211

(22) PCT Filed: Jun. 21, 2005

(86) PCT No.: PCT/EP2005/052892

§ 371 (c)(1),
(2), (4) Date: Dec. 22, 2006

(87) PCT Pub. No.: WO2005/124555

PCT Pub. Date: Dec. 29, 2005

(65) Prior Publication Data

US 2007/0239959 A1    Oct. 11, 2007

(30) Foreign Application Priority Data

Jun. 22, 2004    (FR) .................................. 04 06783

(51) Int. Cl.
*G06F 9/44* (2006.01)
(52) U.S. Cl. .................. 717/124; 717/125; 717/130; 717/135
(58) Field of Classification Search ................. 717/124
See application file for complete search history.

(56) References Cited

U.S. PATENT DOCUMENTS

| 4,853,851 | A |   | 8/1989 | Horsch |
|---|---|---|---|---|
| 5,050,168 | A | * | 9/1991 | Paterson ...................... 714/35 |
| 5,390,323 | A |   | 2/1995 | Newell et al. |
| 5,515,527 | A |   | 5/1996 | Kurashita |
| 6,071,316 | A | * | 6/2000 | Goossen et al. ............. 717/126 |
| 6,314,529 | B1 | * | 11/2001 | Rana ........................... 714/29 |
| 6,397,379 | B1 | * | 5/2002 | Yates et al. ................. 717/140 |
| 6,536,036 | B1 | * | 3/2003 | Pavela ........................ 717/125 |
| 6,959,431 | B1 | * | 10/2005 | Shiels et al. ................ 717/124 |
| 6,978,401 | B2 | * | 12/2005 | Avvari et al. .................. 714/38 |
| 7,143,394 | B1 | * | 11/2006 | Shadmon et al. ........... 717/130 |
| 2005/0043913 | A1 | * | 2/2005 | Hyde et al. ................. 702/119 |
| 2005/0210339 | A1 | * | 9/2005 | Dimpsey et al. ............. 714/57 |

* cited by examiner

*Primary Examiner*—Thomas K Pham
(74) *Attorney, Agent, or Firm*—Lowe Hauptman Ham & Berner, LLP

(57) ABSTRACT

The invention relates to a device for testing the structural coverage of a software program and a method implementing the device. The software, stored in a first memory comprises instructions which can be located via addresses on an address bus connecting the processor to the first memory. The device includes a second memory connected to the address bus that can be used to store values in memory associated with each address, these values indicating the conditions for calling up the associated address by the processor. The method consists in erasing all the contents of the second memory, performing tests validating the software, comparing the contents of the second memory with a list of addresses where instructions are located.

20 Claims, 3 Drawing Sheets

DEVICE FOR TESTING THE STRUCTURAL COVERAGE OF A SOFTWARE PROGRAM AND A METHOD IMPLEMENTING THE DEVICE

CROSS-REFERENCE TO RELATED APPLICATIONS

The present Application is based on International Application No. PCT/EP2005/052892, filed on Jun. 21, 2005 which in turn corresponds to FR Application No. 04 06783 filed on Jun. 21, 2006, and priority is hereby claimed under 35 U.S.C. §119 based on these applications. Each of these applications are hereby incorporated by reference in their entirety into the present application.

FIELD OF THE INVENTION

The invention relates to a device for testing the structural coverage of a software program and a method implementing the device. In the field of aeronautics, standards such as the standard DO 178 B laid down by the United States' Department of Defense calls for strict tests when validating on-board software. Level B of this standard calls for complete structural coverage of the software at the level of instructions and decisions. In other words, when implementing the software, all software instructions must be executed and all decisions must have taken all possible choices.

BACKGROUND OF THE INVENTION

To date, testing structural coverage has not been done directly. Normally a software simulation is used, adapted for running on a 'host' PC for example. On this host it is easy to find out the structural coverage of software. A first complete functional test of the software is also developed on this host. Moreover, a second functional test is developed adapted to the 'target' processor, which will receive the software during its normal operation. If the structural coverage is correct on the host and if both functional tests give the same results, it is deduced that the structural coverage is correct on the target.

Software is generally developed in a 'high level' language, like C for example, then translated into 'machine' language using only instructions directly comprehensible by the processor using the software. When the host processor is similar to that of the target, their machine languages are similar and the type of test disclosed earlier is reliable. But when the host and target processors have different architectures, their machine languages are also different. This difference leads to uncertainty regarding the deduction of structural coverage on the target.

Another solution consists in only performing tests on the target and adding a flag in each branch of the software. If, at the conclusion of the functional tests all the flags have been activated, this proves that all the branches of the software have been used and therefore that the structural coverage is correct. This solution has the drawback of increasing the processor's load factor and including instructions in the software, flags, useless to the operation of the software. These additional instructions degrade the software's reliability.

SUMMARY OF THE INVENTION

The object of the invention is to remedy the drawbacks described earlier by providing a device and a method for testing the structural coverage of a software program, the test being performed directly on the target without the intervention of a host and without modifying the software.

For this purpose, the object of the invention is a device for testing the structural coverage of a software program run by a processor, the software being stored in a first memory, the software comprising instructions which can be located via addresses on an address bus connecting the processor to the first memory, characterized in that it includes a second memory connected to the address bus that can be used to store a first and a second value in memory associated with each address, the first value indicating that the associated address has been called up by the processor and the second value indicating that the associated address has not been called up by the processor. This device can be used to verify structural coverage at the instruction level.

Advantageously, for verifying structural coverage at the decision level, the second memory can further be used to store a third and a fourth value in memory associated with each address, the third value indicating that the instruction located at the address is followed immediately in the execution of the software by an instruction located at the address consecutive to the associated address, the fourth value indicating that the instruction located at the address is not followed immediately, in the execution of the software, by an instruction located in the address consecutive to the associated address.

The object of the invention is also a method implementing a device disclosed above, characterized in that it consists in:
   erasing all the contents of the second memory,
   performing tests validating the software,
   comparing the contents of the second memory with a list of addresses where instructions are located.

This method can be used to verify structural coverage at the instruction level.

Advantageously, for verifying structural coverage at the decision level, the method is completed by analyzing the contents of the second memory. For each instruction including a decisional choice, it is verified that the third and fourth values have been provided.

Still other advantages of embodiments according to the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

The invention will be better understood and other advantages will emerge on reading the detailed disclosure of an embodiment given as an example, a disclosure illustrated by the accompanying drawing in which.

DETAILED DESCRIPTION OF THE PREFERRED EMBODIMENTS

Figure 1:
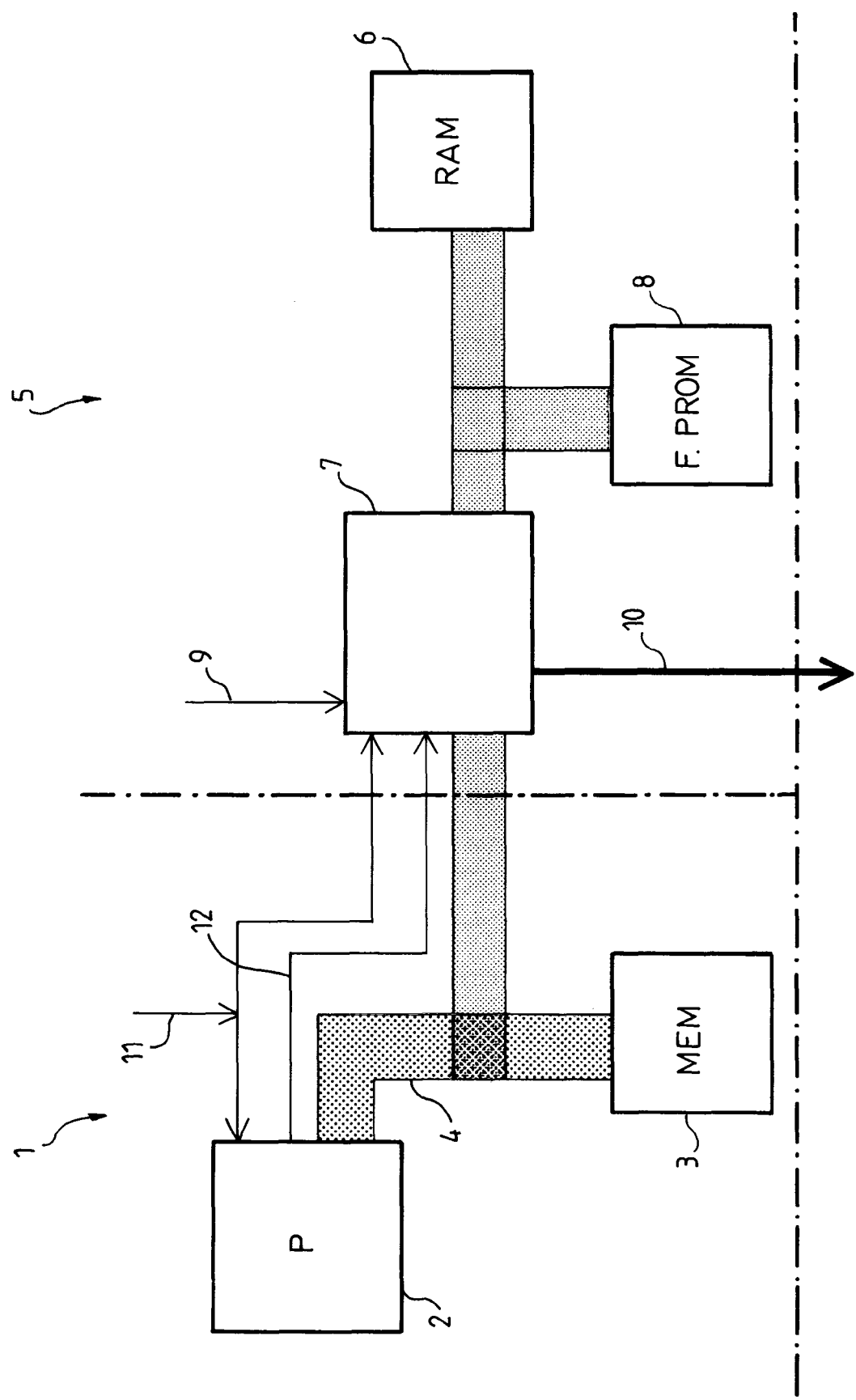
FIG. 1 shows a block diagram of a device for testing the structural coverage of a software program stored in a memory and run by a processor.

FIG. 1 discloses a piece of equipment 1 comprising a processor 2 connected to a memory 3 via an address bus 4. A software program is stored in the memory 3 also known as a program memory. The software program includes instructions which can be located in the memory 3 via addresses on the address bus 4. the [sic] instructions enable the processor 2 to operate. The processor 2 calls up the instructions according to a flow chart or an algorithm defined during the software program's design. Testing the structural coverage of the software is performed when validating the software. This testing consists in verifying that during normal use of the software, all the software instructions are executed by the processor 2. It can also be verified that all decisions have taken all possible choices.

A device 5 for testing structural coverage includes a memory 6 connected to the address bus 4. The memory 6 is of the random access type for example, a type well-known as RAM (Random Access Memory).

The memory 6 can be used to store a first and a second value associated with each address. The first value indicates that the associated address has been called up by the processor 2 and the second value indicates that the associated address has not been called up by the processor 2.

Advantageously, the second memory 6 can be used to store a third and a fourth value associated with each address. The third value indicates that the instruction located at the address is followed immediately in the execution of the software by an instruction located at the address immediately following the associated address. The fourth value indicates that the instruction located at the address is not followed immediately, in the execution of the software, by an instruction located at the address consecutive to the associated address.

Advantageously, the four values can be stored in two bits of the second memory 6. Each address of memory 3 is associated with two bits of memory 6.

Memory 6 comprises at least twice as many bits as addresses used in memory 3 by the software instructions. Advantageously, for being able to use the device 5 whatever the software stored in memory 3, memory 6 comprises twice as many bits as addresses available in memory 3. The device 5 comprises means for giving the bits of memory 6 a logical state representative of the processor 2 calling up the address associated with these bits and representative of the fact that the instruction located at the address is immediately followed or not in the execution of the software, by an instruction located at the address consecutive to the associated address in memory 3. Two addresses are defined as consecutive if they contain two instructions that follow one another in order in software writing.

These means comprise for example a component 7 including programmable logic elements.

Advantageously, the device comprises means for giving the bits of the second memory 6 a logical state representative of the processor 2 calling up the associated address and the address immediately following the associated address in the execution of the software. These means advantageously comprise a component including programmable logic elements. It is, of course, possible to use the component 7.

The four values that the two bits associated with a 'current' address may take, are the following for example. As long as the current address has not been called up, the two bits retain a value of 00. The two bits change value when the next address, in the execution of the software is called up. If the next address is the consecutive address in the address order of memory 3, the two bits are set to a value of 10. If, on the other hand, the next address is not the consecutive address, the two bits are set to a value of 01. Setting the two bits is done cumulatively for example by means of a logical OR function. More precisely, if the two bits corresponding to the current address have a value of 10, the current address is called up again, and the next address this time is not the consecutive address, the two bits are set to 01 via the OR function and in the end, the two bits will take a value of 11.

Advantageously, the device comprises means 7 for comparing the contents of the second memory 6 with a list of addresses where instructions are located. When verifying the structural coverage the contents of memory 6 will be analyzed. When all the pairs of bits corresponding to instructions in memory 3 have values other than 00, the structural coverage is correct at the instruction level. In addition, when all the pairs of bits corresponding to instructions including a decisional choice, have values equal to 11 the structural coverage is correct at the decision level.

Advantageously, to improve the reliability of the device 5, the device has autonomous means of electrical supply, means independent of the processor 2 and memory 3 power supply means. Thus, the device 5 is not subject to possible disruptions in the processor 2 and memory 3 power supply.

Advantageously, again to improve the reliability of the device 5, it has a non-volatile memory 8 enabling the backup of all the data present in memory 6, even in the event of a power cut in the device 5. The memory 8 is of the fast electrically programmable read only type for example, a type well-known as Flash PROM.

In the event of a power cut in the device 5, the contents of the backup memory 8 is enriched by the information contained in memory 6 via a logical non-exclusive "OR" operation. This logical operation is performed bitwise for two bits of memory 6 and two corresponding bits of memory 8.

Advantageously, the device 5 comprises means for erasing all the contents of memory 6, and of memory 8 when it exists, on an external command carried by a link 9. These means are implemented with the aid of the component 7 for example.

Advantageously, the device 5 comprises means for comparing the contents of memory 6 with a list of addresses where software instructions are located. These means are for example implemented with the aid of the component 7 including programmable logic elements. But advantageously, so as not to overload the component 7, a computer external to the device may be used for making the comparison. In this case, the component 7 simply enables the contents of the two memories 6 and 8 to be dumped to the external computer via a link 10. The dump takes place on an external command carried by the link 9.

Advantageously, the device 5 comprises means for determining in the contents of the second memory 6 whether for instructions comprising decisional choices, the third and fourth values have been activated.

A method of implementing the device 5 consists in:
  erasing all the contents of memory 6 and possibly of memory 8 when it exists,
  performing tests validating the software,
  comparing the contents of memory 6 and possibly memory 8 when it exists with a list of addresses where instructions are located.

The erasure of the contents of memories 6 and 8 consists in resetting all their bits to the same logical state, 0 for example. In this example, during the software validation tests, when an instruction is called up by the processor 2, the memory 6 bits corresponding to the instruction address, are set to a logical state, 10 for example, representative of the processor 2 calling up the address associated with these bits as well as the consecutive address. If the same sequence of instructions is called up several times by the processor 2, the corresponding bits of memory 6 remain in the logical state 10.

The equipment 1 usually includes a link 11 for resetting the processor 2. Advantageously, the link 11 is connected to the device 5, to the component 7 for example, which thus receives information on the fact that the processor 2 is in operation or is reset. Advantageously, during validation tests, storing values in memory is interrupted when the processor 2 is reset.

Advantageously, a link 12 can carry a signal indicating that the processor 2 is performing software validation tests. This signal is henceforth referred to as: "test active".

An example of an algorithm used during software validation tests for testing the structural coverage of the software is given at the end of disclosure.

Figure 2:
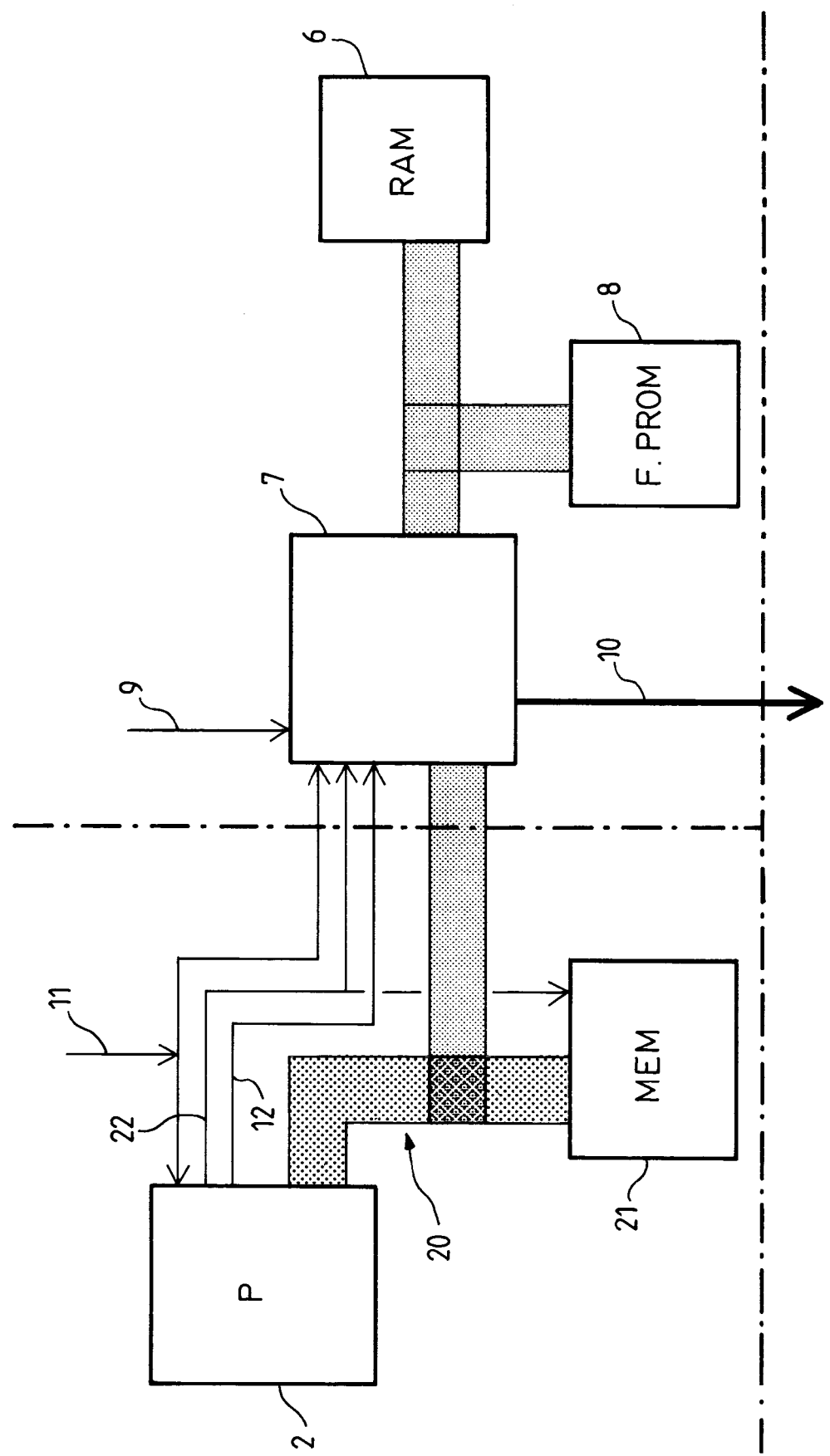
FIG. 2 depicts the testing device from FIG. 1 adapted for testing the data stream.
Figure 3:
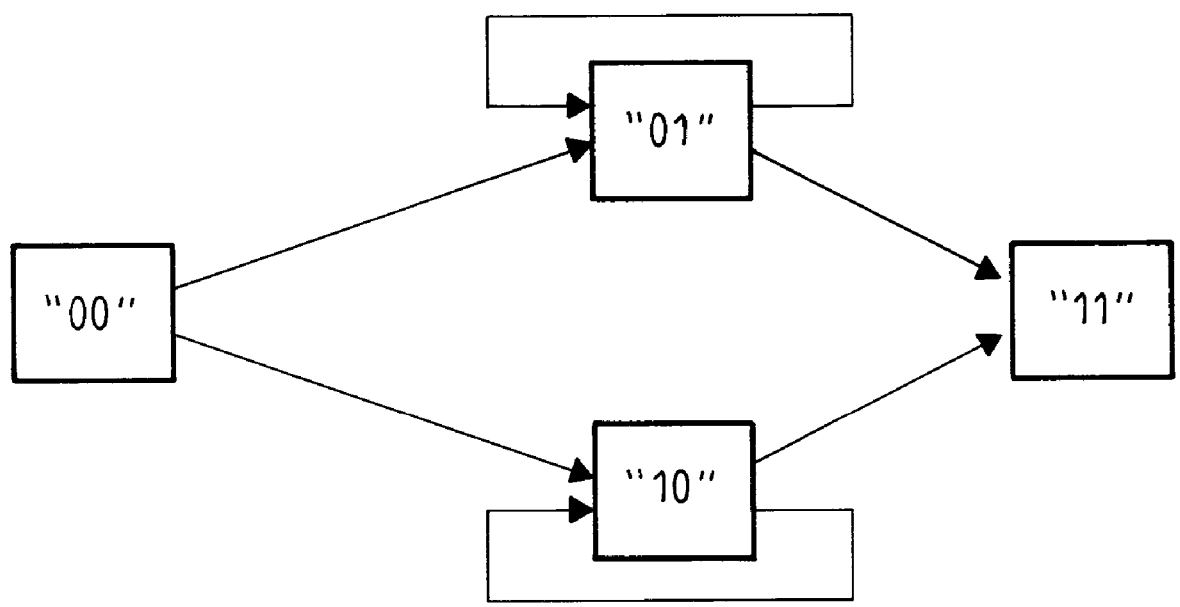
FIG. 3 depicts an example of a pointer testing the use of data utilized by the software.

Illustrated by FIG. 2, the device 5 advantageously comprises means of testing a data stream used by the processor 2. The DO 178 B standard also relates to the data used by the software. More precisely, standard DO 178 B lays down two requirements regarding the data. Firstly, all the data defined must be used by the software. Secondly, each datum must be produced before being used. The second requirement can be expressed by the fact that the value of a datum must be written before being read in the memory location reserved for it.

The means for testing a data stream are for example implemented with the aid of the component 7 including programmable logic elements. The component 7 is then connected temporarily to the data bus during the software validation tests.

The equipment 1 includes a data bus 20 connecting the processor 2 to a data memory 21. In many equipment devices the data bus 20 is merged with the address bus 4 and the data memory 21 is merged with memory 3 containing the software. A differentiation is then made between the instruction data via different address blocks. The device 5 will therefore be able to differentiate a data instruction by means of the address routed on the address bus 4.

A link 22 connects the processor 2 to the memory 21, a link on which the processor 2 informs the memory 21 of the fact that the datum addressed must be read or written. The device 5 is connected both to the bus 20 and to the link 22. the [sic] memories 6 and 8 of the device are advantageously used for testing the use of the data defined in memory 21. A location in memories 6 and 8 is associated with each datum, a location in which a pointer may be stored capable of taking four current settings. Two bits are used for example to store these four current settings in memory. The first current setting, for example denoted by 00 by means of the two bits, represents the fact that the software has not accessed the corresponding datum. The second current setting, for example denoted by 01 by means of the two bits, represents the fact that the software has read the value of the datum before writing it. The third current setting, for example denoted by 10 by means of the two bits, represents the fact that the software has written a value of the datum before reading it. The fourth current setting, for example denoted by 11 by means of the two bits, represents the fact that the software has written a value of the datum and has read it. Advantageously, during validation tests, the invention method consists, for each datum, in generating a flag, called a KO flag, showing whether the datum has been read without having been previously written. In other words, the KO flag indicates passage through the second current setting denoted by 01.

When erasing the contents of memories 6 and 8, for each datum, the pointer takes the first current setting, i.e. 00.

During software validation tests, the current setting of each datum's pointer is modified according to the use made of the different data by the software. If for a datum, the pointer takes the second current setting 01, the KO flag is activated and remains activated until the end of the validation tests. Likewise, if for a datum, the pointer takes the third current setting 10, the KO flag is activated and remains activated until the end of the validation tests. Each of the two flags can be stored in memories 6 and 8 in a single bit each taking the value 1 when it is activated and 0 when it is not.

In order for the data stream test result to be positive, that is to say that the two requirements described earlier be fulfilled, it is necessary that only fourth values should be associated with all the data and that no KO flag has been validated.

Advantageously, during validation tests, the invention method consists, for each datum, in generating a flag, called an OK flag, showing whether the datum has been written without having been previously read, then read. In other words, the OK flag indicates passage through the third current setting.

Advantageously, the flag is reinitialized each time the processor 2 is reset. To do this, the processor 2 reset signal is stored in memory. This storage in memory may be performed in one bit and in this case, the logical state 1 corresponds for example to the fact that the processor 2 is in operation and the logical state 0 corresponds for example to the fact that the processor 2 has been reset. For each datum, the number of resets already performed on the processor 2 is also stored in memory. If, during the validation test, for a datum the stored reset number does not correspond to the current reset number of the processor 2, the pointer is returned to the first current setting denoted by 00.

An example of an algorithm used during software validation tests for testing the data stream used by the processor 2.

Example of an Algorithm Used During Software Validation Tests for Testing the Structural Coverage of the Software

---

If the microprocessor 2 is not reset
    If the "test active" signal is present
        If the address of an instruction corresponds to
        a memory 3 field
            If the address of the preceding instruction
            AIn−1 in memory 3 is such that $Ai_n = AI_{n-1} + 1$
                EM6 $(AI_{n-1})$ = EM6 $(AI_{n-1})$ OR "10"
            If not
                EM6 $(AI_{n-1})$ = EM6 $(AI_{n-1})$ OR "01"
            End If
        End If
    End If
End If

---

In this algorithm, $Ai_n$ represents the address of the instruction of rank n in the software program, $AI_{n-1}$ represents the address of the instruction of rank n−1 in the software program, EM6 represents the two bits of memory 6 associated with the address $AI_{n-1}$.

Example of an Algorithm Used During Software Validation Tests for Testing the Data Stream Used by the Processor

---

If the microprocessor 2 is not reset
    If the stored setting of the processor 2 reset
    signal is "0"
        the current reset number counter is
        incremented and a stored reset setting of "1"
        is indicated -continued

```
        End If
        If the "test active" signal is set
            If the address on the address bus corresponds
            to a data memory field
                If the reset number of the last passage to
                this address does not correspond to the
                current reset counter
                    it is indicated that the last passage
                    to this address corresponds to the
                    running reset number counter
                    the "current setting" is set to "00"
                End If
                If the "read write" signal is set to "read"
                    new "current setting" = OR (old "current
                        setting";"01")
                Else
                    new "current setting" = OR (old "current
                        setting";"10")
                End If
                If "current setting" = "01"
                    the KO flag is set to "1"
                End If
                If "current setting" = "11"
                    the OK flag is set to "1"
                End If
            End If
        End If
    Else
        a stored setting of the processor 2 reset signal
        is indicated as "0"
    End If
```

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A device for testing a structural coverage of a software program stored in an equipment, the equipment having a first memory configured to store the software program, the software program having instructions locatable via addresses corresponding to the instructions, a processor coupled to the first memory and configured to call up and execute at least a portion of the instructions, and an address bus coupled to the processor and the first memory, the device comprising:

a second memory connected to the address bus and configured to store an address for each corresponding instruction and a setting associated with the stored address, the setting having at least a first value, a second value, a third value, or a fourth value, wherein the first value indicating that an instruction located at the associated address has been called up by the processor, the second value indicating that the instruction located at the associated address has not been called up by the processor, the third value indicating that the instruction located at the associated address is followed immediately, in the execution of the software, by another instruction located at the address immediately following the associated address, and the fourth value indicating that the instruction located at the associated address is not followed immediately, in the execution of the software program, by the another instruction located at the address immediately following the associated address.

2. The device as claimed in claim 1, comprising means for comparing the contents of the second memory with a list of addresses where instructions are located.

3. The device as claimed in claim 1, wherein the setting is stored in two bits of the second memory, and the device further comprising means for giving the bits of the second memory a logical state representative of the processor calling up the associated address and address immediately following the associated address in the execution of the software program.

4. The device as claimed in claim 1, comprising means for determining in the contents of the second memory whether for instructions comprising decisional choices according to the existence of the third or fourth value.

5. The device as claimed in claim 1, comprising an autonomous means of powering the device that is independent of a power supply configured to supply power to the processor and the first memory.

6. The device as claimed in claim 1, wherein the second memory is of the random access type, and the device further comprises a backup memory configured to receive all the data present in the second memory.

7. The device as claimed in claim 1, comprising means for erasing all the contents of the second memory on an external command.

8. The device as claimed in claim 1, wherein the device comprises means of testing a data stream used by the processor.

9. The device as claimed in claim 2, wherein the setting is stored in two bits of the second memory, and the device further comprising means for giving the bits of the second memory a logical state representative of the processor calling up the associated address and address immediately following the associated address in the execution of the software program.

10. The device as claimed in claim 2, comprising means for determining in the contents of the second memory whether for instructions comprising decisional choices according to the existence of the third or fourth value.

11. The device as claimed in claim 3, wherein the means for giving the bits of the second memory a logical state representative of the processor calling up the associated address and the address immediately following the associated address in the execution of the software program has a component including programmable logic elements.

12. The device as claimed in claim 9, wherein the means for giving the bits of the second memory a logical state representative of the processor calling up the associated address and the address immediately following the associated address in the execution of the software program has a component including programmable logic elements.

13. A method of operating the device as claimed in claim 1, comprising:

erasing all contents of the second memory;

performing tests validating the software including modifying the setting; and comparing the contents of the second memory with a list of addresses where instructions are located.

14. The method as claimed in claim 13, further comprising:

analyzing the contents of the second memory, for each instruction including a decisional choice, it is verified that the third or fourth value have been provided.

15. The method as claimed in claim 13, wherein during the validation tests storing values in memory is interrupted when the processor is reset.

16. The method as claimed in claim 13, wherein the validation tests comprising for each datum, generating a flag showing whether the datum has been written without having been previously read.

17. The method as claimed in claim 13, wherein the validation tests comprising, for each datum, generating a flag showing whether the datum has been read without having been previously written.

18. The method as claimed in claim 14, wherein the validation tests comprising, for each datum, generating a flag showing whether the datum has been written without having been previously read.

19. The method as claimed in claim 14, wherein the validation tests comprising, for each datum, generating a flag showing whether the datum has been read without having been previously written.

20. A method as claimed in claim 16, wherein the flag is reinitialized each time the processor is reset.

* * * * *